Patented Nov. 1, 1927.

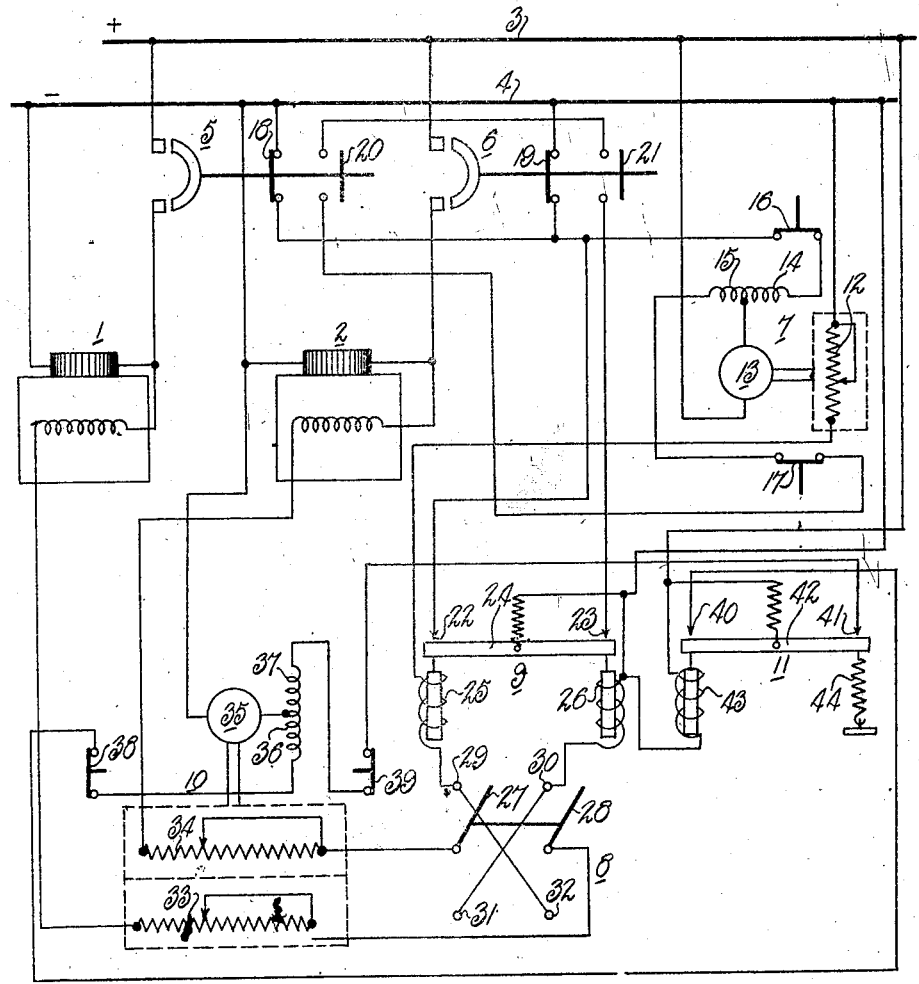

1,647,313

UNITED STATES PATENT OFFICE.

THOMAS WYLIE ROSS, OF MANCHESTER, ENGLAND, ASSIGNOR TO WESTINGHOUSE ELECTRIC AND MANUFACTURING COMPANY, A CORPORATION OF PENNSYLVANIA.

REGULATING OR CONTROL SYSTEM FOR DYNAMO-ELECTRIC MACHINES.

Application filed August 15, 1925, Serial No. 50,503, and in Great Britain August 15, 1924.

This invention relates to the regulation or control of dynamo-electric machines and particularly to the regulation or control of a plurality of machines in a system wherein the number of the machines in co-operation is dependent upon the load. Thus in a generating station or substation supplying a varying load it is usual in the interests of efficiency or economy to provide a plurality of relatively small machines and to operate only so many of them as are necessary to supply the demand. Whilst joint voltage regulation of several simultaneously operating machines can be effected, unstable temperature conditions may arise in the station when a cold machine which has been standing idle is called into operation along with a machine which has been supplying load and is therefore warm, and by reason of such unstable temperature conditions the field excitation is different in the respective machines which therefore may not correctly share the load. Regulation in this respect is consequently desirable, particularly in automatic or semi-automatic substations.

According to the invention for a plurality of dynamo-electric machines a regulating system is provided comprising means for automatically controlling the current in the field winding circuit of a machine during unstable temperature conditions thereof whereby said machine is caused to share the load with the parallel connected machine or machines in a predetermined manner. Preferably a motor operated rheostat for inserting or removing resistance in the field winding circuit of the machine is provided, the operation of the motor in one direction or the other being controlled by a relay differentially energized in accordance with the current in the field winding circuit of the machine and with a predetermined current. Where the machine is connected in parallel with a machine already running the predetermined current for the differential relay may be the current in the field winding circuit of the second machine. In this case for both machines additional voltage regulating means may be provided which are coupled together to provide simultaneous equal regulation of the machines whereby they share the load in a constant manner, and maintain a constant voltage.

In order that the invention can be fully understood one embodiment thereof will be described with reference to the accompanying drawing which illustrates two similar generators or converters, located for example in an automatic substation, having voltage regulating means whereby the voltage of either of the machines is controlled during unstable temperature conditions thereof. Additional voltage regulating means are shown which are coupled together to provide simultaneous and equal voltage regulation of the machines.

Referring to the drawing two similar shunt wound generators or converters are shown by 1 and 2. Said machines are adapted to be connected in parallel to supply the bus-bars 3 and 4 by means of the circuit-breakers 5 and 6 respectively. The voltage regulating means for either machine during unstable temperature conditions thereof is shown by 7. Said voltage regulating means 7 may be associated with either of the two machines 1 and 2, according to which machine is running steadily and which is subsequently started up, by the manually or automatically operated switch 8. The operation of the voltage regulating means 7 is controlled by the differential relay device 9. The additional voltage regulating means for both machines is shown by 10, and the operation thereof is controlled by the voltmeter relay device 11.

The voltage regulating means 7 comprises a rheostat 12 operated by a reversible motor 13 having alternative field windings 14 and 15 for forward and reverse operation. Limit switches 16 and 17, connected in series with the windings 14 and 15 respectively, are provided to prevent overtravel of the rheostat. Said limit switches are respectively adapted to be operated when the rheostat contact member reaches the end of its travel in either direction. The motor 13 is arranged to be energized for running in the forward direction from the positive bus-bar through the armature of the motor, the field winding 14, the limit switch 16, and either through the parallel connected contacts of interlock switches 18 and 19 on the circuit-breakers 5 and 6 respectively, or through the differential relay device 9, to the negative bus-bar. The motor 13 is arranged to be energized for running in the reverse direction from the positive bus-bar through the armature of the motor, the field winding 15, the limit switch 17, and the series connected contacts of interlock switches 20 and 21 on the circuit-breakers 5 and 6 respectively, through the differential relay device 9 to the negative bus-bar.

The differential relay device 9 comprises contact members 22 and 23 and a centrally pivoted contact arm 24 adapted to engage alternatively with either of the contact members. The contact member 22 is connected in series with the parallel connected contacts of interlock switches 18 and 19, and the contact member 23 is connected in series with the series connected contacts of interlock switches 20 and 21. The centrally pivoted contact arm 24 is connected to the negative bus-bar. Thus, when the contact arm 24 engages with the contact member 22 the circuit of the motor 13 through the field winding 14 is completed between the positive and negative bus-bars, and when the contact arm 24 engages with the contact member 23 the circuit of the motor through the field winding 15 is similarly completed. The contact arm 24 is arranged to be operated in one direction or the other by core members attached to the ends thereof and controlled by the solenoids 25 and 26. The solenoid 25 is connected from the negative bus-bar through the rheostat 12 to the terminal 29 of the switch 8 and the solenoid 26 is connected directly from the negative bus-bar to the terminal 30 of the switch. The ampere turns on the solenoids 25 and 26 are made equal if the machines are similar, but if dissimilar the ampere turns are adjusted correspondingly.

The switch 8 is of the two-pole double throw type and comprises the mechanically coupled switch arms 27 and 28 which engage respectively in one position with the terminals 29 and 30 and in the other position with the terminals 31 and 32. The pairs of terminals 29 and 32, and 30 and 31 are respectively cross-connected. The switch arm 27 is connected to the positive bus-bar through the field winding of the machine 2 and the switch arm 28 is similarly connected to the positive bus-bar through the field winding of the machine 1. The switch 8 is adapted to be operated to either of its two positions in such a manner that the solenoid 26 is connected in series with the field winding of the steadily running machine and the solenoid 25 in series with the field winding of the subsequently started machine in which the temperature conditions are unstable during the starting period.

The additional voltage regulating means 10 comprises the rheostats 33 and 34 connected in series respectively with the field windings of the machines 1 and 2. Said rheostats are adapted to be operated simultaneously by the reversible motor 35 having alternative field windings 36 and 37 for forward and reverse operation. Limit switches 38 and 39 are provided to prevent overtravel of the rheostats. Said limit switches are respectively adapted to be operated when the rheostat contact members reach the end of their travel in either direction. The circuit of the motor 35 is arranged to be completed for running in the forward direction from the negative bus-bar through the armature of the motor, the field winding 36, the limit switch 38, through the voltmeter relay device 11 to the positive bus-bar. The circuit of the motor 35 for operation in the reverse direction is arranged to be energized from the negative bus-bar through the armature of the motor, the field winding 37, the limit switch 39, through the voltmeter relay device 11 to the positive bus-bar. The voltmeter relay device 11 controlling the operation of the voltage regulating means 10 comprises the contact members 40 and 41 and the centrally pivoted contact arm 42 adapted to engage alternatively with either of the contact members. When the contact arm 42 engages with the contact member 40 the circuit of the motor 35 through the field winding 36 is completed, and when the contact arm 42 engages with the contact member 41 the circuit of the motor 35 through the field winding 37 is completed. The contact arm 42 is arranged to be operated in one direction or the other by a core member attached to one end thereof and by a spring or weight 44 attached to the other. The core member is controlled by a solenoid 43 which is connected across the positive and negative bus-bars. The contact arm 42 is arranged to be out of engagement with either of the contact members 40 or 41 for a predetermined voltage across the bus-bars while for voltages different from the predetermined value the contact arm engages with either contact member 40 or contact member 41 according to whether the voltage is less than or greater than the predetermined value.

In operation it will be assumed that the circuit breaker 5 is closed and the machine 1 running steadily. If now the load on the bus-bars increases by a predetermined amount the machine 2 is automatically called into operation by means not shown which closes the circuit breaker 6. The switch 8 is simultaneously operated so that the switch arms 27 and 28 engage with the terminals 29 and 30 respectively. Owing to the change of resistance with temperature it will be assumed that the current through the field winding of the cold machine 2 is initially greater than that through the field winding of the steadily running machine 1. The switch 8 connects the field winding of the machine 2 in series with the rheostat 12 the contact member of which, as will be explained hereafter, is in such a position that the minimum resistance is included. The solenoid 25 is in series with the field winding of the machine 2 and the solenoid 26 is in series with the field winding of the machine 1. Therefore, the contact arm 24 engages with the contact member 23 owing to the large current flowing through the solenoid 25 and completes the circuit of the motor 13 through the field winding 15. The motor 13 thereby operates the rheostat 12 to increase the resistance in the field winding circuit of the machine 2 until the currents through the windings of the two machines are equal, when the forces on the core members controlled by the solenoids 25 and 26 become equal and the contact arm disengages from the contact member 23. As the temperature of the field winding of the machine 2 approaches the normal temperature of operation the resistance thereof increases so that the motor 13 operates the rheostat 12 gradually to cut out the resistance initially inserted, the currents through the two field windings remaining substantially equal. When the temperature of the field winding of the machine 2 reaches the normal operating value, the position of the contact member of the rheostat 12 remains constant.

When either of the machines 1 or 2 is disconnected through either the circuit breakers 5 or 6 being opened, the circuit of the motor 13 is completed through the field winding 14. The motor 13 thereby operates the contact member of the rheostat 12 to such a position that the interlock switch 16 is operated and the motor deenergized in which position the minimum resistance is included.

During combined operation of the machines 1 and 2 additional voltage regulation is obtained by means of the voltage regulating means 10. When the voltage across the bus-bars changes from the predetermined value at which the voltmeter relay device 11 is set, either the field winding 36 or the field winding 37 of the motor 35 is energized by the contact arm 42 engaging with either the contact member 40 or the contact member 41 and the motor 35 operated in either the forward or the reverse direction to control simultaneously the contact members of the rheostats 33 and 34. Resistance is thereby included in or removed from the circuits of the field windings of the machines 1 and 2 until the voltage across the bus-bars again reaches the predetermined value, when the contact arm 42 remains in its disengaged position.

Since the temperature characteristics of a dynamo-electric machine do not vary within wide limits and can be approximately ascertained, the arrangement described can be simplified by the omission of the differential relay 9 and by the provision in place thereof of a timing device which will cause the rheostat 12 to cut out resistance gradually during a predetermined interval of time corresponding in length to the time during which the associated machine reaches its normal operative temperature.

It is to be understood that the invention is not limited to the arrangement described by way of example, but that various modifications can be made without departing from the scope of the invention.

I claim as my invention:

1. In an electrical translating station, the combination with a circuit, a plurality of dynamo-electric machines for supplying energy thereto, and a field-magnet winding for each machine, of means comprising a relay device for effecting equalization of the currents traversing the field-magnet windings of the several machines.

2. In an electrical translating station, the combination with a circuit, a plurality of dynamo-electric machines for supplying energy thereto, means for connecting each machine in parallel relation to the circuit, and a field-magnet winding for each machine, of means comprising a relay device for effecting equalization of the currents traversing the field-magnet windings of the several machines to equalize the loads on the several machines.

3. In an electrical translating station, the combination with a circuit, a plurality of dynamo-electric machines for supplying energy thereto, means for connecting each machine in parallel relation to the circuit, and a field-magnet winding for each machine, of means comprising a differential relay device for causing the field-magnet windings of the several machines to be traversed by currents in a predetermined ratio of values.

4. In an electrical translating station, the combination with a circuit, a plurality of dynamo-electric machines for supplying energy thereto, means for connecting each machine in parallel relation to the circuit, and a field-magnet winding for each machine, of means comprising a differential relay device for causing the field-magnet windings of the several machines to be traversed by currents in a predetermined ratio of values to cause the total load on the several machines to be distributed therebetween in a predetermined ratio.

5. In an electrical translating station, the combination with a circuit, two dynamo-electric machines for supplying energy thereto, means for connecting each machine in parallel relation to the circuit, and a field-magnet winding for each machine, of a relay device comprising two differentially disposed windings respectively connected in series with the field-magnet windings of the machines, a resistor connected in circuit with the field-magnet winding of one of the machines, and means controlled by the relay device for varying the effectiveness of the resistor.

6. In an electrical translating station, the combination with a circuit, two dynamo-electric machines for supplying energy thereto, means for connecting each machine in parallel relation to the circuit, and a field-magnet winding for each machine, of a relay device comprising two differentially disposed windings respectively connected in series with the field-magnet windings of the machines, a resistor connected in circuit with the field-magnet winding of one of the machines, means controlled by the relay device for varying the effectiveness of the resistor, and means for disconnecting the resistor from the field-magnet winding circuit of one machine and connecting it in the field-magnet winding circuit of the other machine and for simultaneously interchanging the connections of the differentially disposed winding with respect to the field-magnet windings of the two machines.

7. In an electrical translating station, the combination with a circuit, two dynamo-electric machines for supplying energy thereto, means for connecting each machine in parallel relation to the circuit, and a field-magnet winding for each machine, of a relay device comprising two differentially disposed windings respectively connected in series with the field-magnet windings of the machines, a resistor connected in circuit with the field-magnet winding of one of the machines, means controlled by the relay device for varying the effectiveness of the resistor, and a double-pole double-throw reversing switch for disconnecting the resistor from the field-magnet winding circuit of one machine and connecting it in the field-magnet winding circuit of the other machine and for simultaneously interchanging the connections of the differentially disposed windings with respect to the field-magnet windings of the two machines.

In testimony whereof I have hereunto subscribed my name this seventh day of August, 1925.

THOMAS WYLIE ROSS.